US 6,684,660 B1

(12) United States Patent
Bruno et al.

(10) Patent No.: US 6,684,660 B1
(45) Date of Patent: Feb. 3, 2004

(54) PNEUMATIC CABIN SUPER CHARGER

(75) Inventors: Louis J. Bruno, Ellington, CT (US); Thomas Zywiak, Suffield, CT (US); Harold W. Hipsky, Willington, CT (US)

(73) Assignee: Hamilton Sundstrand, Windsor Locks, CT (US)

(*) Notice: Subject to any disclaimer, the term of this patent is extended or adjusted under 35 U.S.C. 154(b) by 0 days.

(21) Appl. No.: 10/214,547

(22) Filed: Aug. 8, 2002

(51) Int. Cl.$^7$ ................................................. F25D 9/00
(52) U.S. Cl. ............................................. 62/402; 62/86
(58) Field of Search ...................................... 62/86, 402

(56) References Cited

U.S. PATENT DOCUMENTS

| | | |
|---|---|---|
| 4,312,191 A | 1/1982 | Biagini |
| 5,114,103 A | 5/1992 | Coffinberry |
| 5,168,447 A | 12/1992 | Moore |
| 5,461,882 A | 10/1995 | Zywiak |
| 5,860,283 A | 1/1999 | Coleman et al. |
| 5,887,445 A | 3/1999 | Murry et al. |
| 5,890,957 A | 4/1999 | Scherer et al. |
| 5,924,293 A | 7/1999 | Jonqueres |
| 6,128,909 A | 10/2000 | Jonqueres |
| 6,257,003 B1 | 7/2001 | Hipsky |
| 6,401,473 B1 * | 6/2002 | Ng et al. .................... 62/86 |

* cited by examiner

Primary Examiner—Henry Bennett
Assistant Examiner—Malik N. Drake
(74) Attorney, Agent, or Firm—Carlsons, Gaskey & Olds

(57) ABSTRACT

An aircraft air conditioning air supply system is provided that includes a primary propulsion turbine engine having a bleed valve providing pressurized air. A ram air inlet provides ram air. A super charger includes a spool with at least two turbines mounted thereon driven by the pressurized air from the engine. At least one compressor is connected to the turbines, preferably mounted on the same spool as the turbines, and receives the ram air. The turbines drive the compressor and compresses the ram air for use by an air conditioning pack. The supercharger provides compressed air to an air conditioning pack that conditions the compressed air and distributes the refrigerated air throughout the aircraft. The number of turbines and compressors for the super charger is selected by matching the specific speeds of the compressors and turbines.

22 Claims, 1 Drawing Sheet

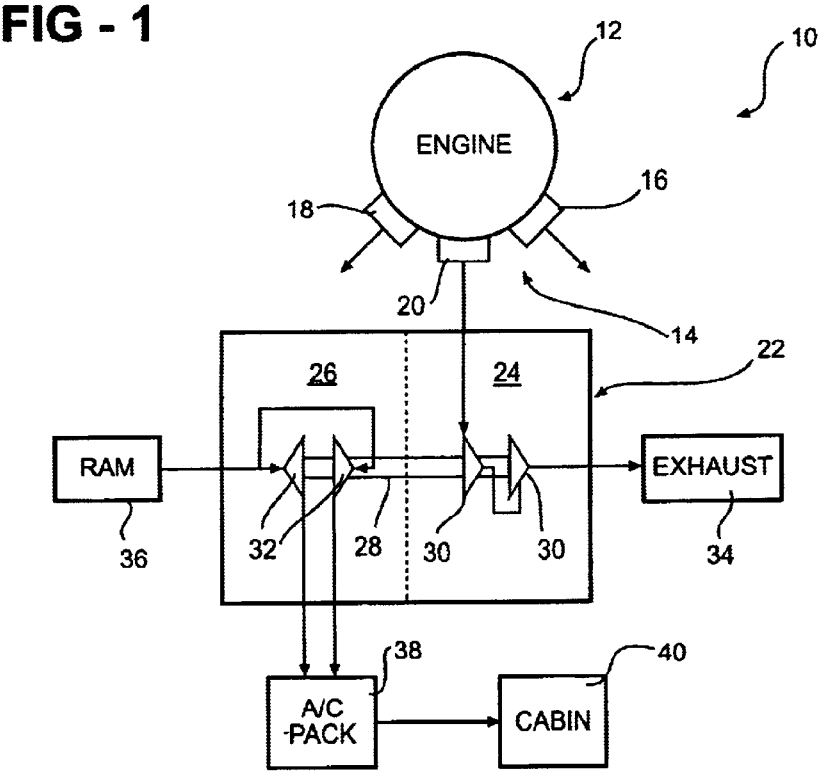
FIG - 1
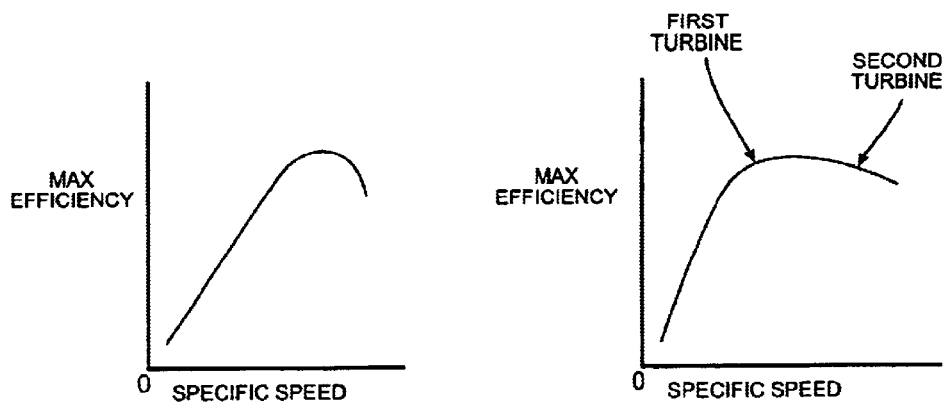
FIG - 2  FIG - 3

PNEUMATIC CABIN SUPER CHARGER

BACKGROUND OF THE INVENTION

This invention relates to an air conditioning system for an aircraft, and more particularly, the invention relates to a pneumatic cabin super charger.

Aircraft engine designs typically employ bleed ports that pipe air to air supply systems or bleed systems that provide compressed air to an air conditioning system. An environmental control system (ECS) distributes the conditioned air throughout the aircraft. In the 1960's the Convair 880 utilized a super charger having a single compressor and a single turbine to provide compressed air for the air conditioning system.

Typically, one of the engine bleed ports provides fan air to cool the bleed air supplied to the air conditioning system. An intermediate pressure bleed port provides air for the air conditioning system to ventilate and cool the aircraft cabin during normal flight. A high pressure bleed air port ventilates and cools the aircraft cabin during ground idle and aircraft descent. The intermediate pressure bleed port location is typically located on the engine such that sufficient air pressure is provided for a scenario referred to as "hot day, end of cruise", which simulates a worse case scenario for aircraft ventilation. As a result, the intermediate pressure bleed port exceeds the ECS pressure requirements during a typical standard day cruise.

Typically, the ECS only requires approximately 30 psi of air pressure. At the standard day cruise condition the bleed port provides a pressure much higher than 30 psi, sometimes as much as 40–90 psi, and a pressure regulator must be employed to throttle the intermediate pressure bleed air to the desired air pressure.

As a result, bleed air is provided at a much higher pressure than is typically required and the engine efficiency is reduced. Other alternatives have been proposed to increase the efficiency of the engine such as taking air from the lower pressure sections of the engine compressor. However, such alternatives are not feasible because the compressor sections typically contain variable geometry and guide vanes that make such a system undesirable. Therefore, what is needed, is an air conditioning system and super charger that reduces the air pressure bled from the engine and increases overall engine efficiency.

SUMMARY OF THE INVENTION AND ADVANTAGES

The present invention provides an aircraft air conditioning air supply system including a primary propulsion turbine engine having a bleed valve providing pressurized air. A ram air inlet provides ram air. A super charger includes a spool with at least two turbines mounted thereon driven by the pressurized air from the engine. At least one compressor is connected to the turbines, preferably mounted on the same spool as the turbines, and receives the ram air. The turbines drive the compressor and compresses the ram air for use by an air conditioning pack. The supercharger provides compressed air to the air conditioning pack. The air conditioning pack provides refrigerated air that is distributed throughout the aircraft.

The number of turbines and compressors for the super charger is selected by matching the specific speeds of the compressors and turbines. The specific speed is indicative of the efficiency of the compressor and turbine and provides an overall efficiency of the super charger. Of course, the number of turbines and compressors dictates the cost of the super charger and is balanced against the increased efficiency from the engine due to the reduced amount of bleed air required for the super charger.

Accordingly, the above invention provides an air conditioning system and super charger that reduces the air pressure bled from the engine and increases the overall engine efficiency.

BRIEF DESCRIPTION OF THE DRAWINGS

Other advantages of the present invention can be understood by reference to the following detailed description when considered in connection with the accompanying drawings wherein:

FIG. 1 is a schematic view of the air conditioning system of the present invention;

FIG. 2 is a graph of the specific speed versus maximum efficiency for a compressor; and FIG. 3 is a graph of the specific speed versus maximum efficiency of two turbines.

DETAILED DESCRIPTION OF THE PREFERRED EMBODIMENT

An air conditioning system 10 is shown schematically in FIG. 1. The system 10 includes a primary propulsion engine 12 utilized to propel the aircraft. The engine 12 typically includes several bleed ports that provide bleed air to various components of the aircraft and are located along the engine in such a manner so as to provide a desired amount of air pressure. For example, a compressor section 14 of the engine 12 includes a fan bleed air valve 16 that is used to provide air to cool the bleed air valves. A high pressure bleed valve is used to provide higher pressure air to those aircraft components requiring high pressure air. An intermediate pressure bleed valve 20 provides intermediate pressure air, which is typically used for air conditioning of the aircraft.

Bleed air from the valve 20 may be as high as 40–90 psi, although the air conditioning system typically only requires air pressure of approximately 30 psi. The present invention incorporates a super charger 22 configured such that a reduced amount of bleed air is required from the engine thereby increasing the overall efficiency of the engine. The present invention supercharger 22 includes a turbine section 24 driving a compressor section 26. Preferably, a single spool 28 includes at least two turbines 30, preferably two turbines, and compressor portions 32 mounted on the spool 28. The configuration of the compressor portions 32 shown in FIG. 1 depicts a double entry compressor, although other compressor configurations may be used. Ram air enters from a ram air source 36 into the compressor portions 32 to provide compressed air to the a/c pack 38. The double entry compressor shown reduces the amount of ram air entering each compressor portion 32 by half, which permits the compressor to run more efficiently at increased speeds.

The turbines 30 may includes an exhaust port 34 that exhausts the air compressed by the turbine to provide supplemental propulsion to the aircraft. A particular set of turbines (FIG. 3) or compressor (FIG. 2) portions will have a specific speed corresponding to a particular efficiency of that component. Specific speed is widely used in fluid mechanics to relate efficiency to speed regardless of the dimensions of the turbine or compressor.

The compressed air from the compressor portions 32 is changed to refrigerated air in the A/C pack 38 through a refrigeration cycle which is then provided for distribution throughout the aircraft cabin 40. The A/C pack may be an air or vapor cycle pack.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An aircraft air conditioning system comprising:
   a primary propulsion turbine engine having a bleed valve providing pressurized air;
   a ram air inlet providing ram air;
   a super charger including a spool with at least two turbines mounted thereon and driven by said pressurized air, and at least one compressor connected to said turbines receiving said ram air and producing compressed air; and
   an air conditioning pack receiving said compressed air and producing refrigerated air and distributing said refrigerated air throughout the aircraft.

2. The air conditioning system according to claim 1, wherein said super charger includes a single spool with said at least one compressor mounted on said single spool.

3. The air conditioning system according to claim 1, wherein said compressor is a double entry compressor having two compressor portions receiving approximately half of said ram air.

4. The air conditioning system according to claim 1, wherein said super charger includes an exhaust port venting exhaust air from said turbines and producing secondary propulsion.

5. The air conditioning system according to claim 1, wherein said primary propulsion turbine engine includes a compressor section with said bleed valve in communication with said compressor section providing intermediate pressure air, and further including a fan air bleed valve and a high pressure bleed valve each respectively providing low and high pressure air.

6. The air conditioning system according to claim 1, wherein said air conditioning pack is an air cycle pack.

7. The air conditioning system according to claim 1, wherein said air conditioning pack is a vapor cycle pack.

8. The air conditioning system according to claim 1, wherein said turbines utilize an amount of said pressurized air less than an available amount of said pressurized air.

9. An aircraft air conditioning system comprising:
   a primary propulsion turbine engine having a bleed valve providing pressurized air;
   a ram air inlet providing ram air;
   a super charger including a spool with at least one turbine mounted thereon and driven by said pressurized air, and at least one compressor connected to said at least one turbine receiving said ram air and producing compressed air with the number of at least one turbine and at least one compressor totaling at least three; and
   an air conditioning pack receiving said compressed air and producing refrigerated air and distributing said refrigerated air throughout the aircraft.

10. The air conditioning system according to claim 9, wherein said super charger includes at least two turbines.

11. The air conditioning system according to claim 10, wherein said super charger includes a single spool with said at least one compressor mounted on said single spool.

12. The air conditioning system according to claim 11, wherein said compressor is a double entry compressor having two compressor portions receiving approximately half of said ram air.

13. The air conditioning system according to claim 9, wherein said super charger includes an exhaust port venting exhaust air from said turbines and producing secondary propulsion.

14. The air conditioning system according to claim 9, wherein said primary propulsion turbine engine includes a compressor section with said bleed valve in communication with said compressor section providing intermediate pressure air, and further including a fan air bleed valve and a high pressure bleed valve each respectively providing low and high pressure air.

15. The air conditioning system according to claim 9, wherein said air conditioning pack is an air cycle pack.

16. The air conditioning system according to claim 9, wherein said air conditioning pack is a vapor cycle pack.

17. The air conditioning system according to claim 9, wherein said turbines utilize an amount of said pressurized air less than an available amount of said pressurized air.

18. A method of providing an air conditioning system super charger comprising the steps of:
   a) supplying pressurized air from a primary propulsion turbine engine;
   b) providing a super charger having a number of turbines driven by a portion of the pressurized air with the number of turbines having a first specific speed;
   c) providing the super charger with a number of compressors driven by the turbines and having a second specific speed matched to the first specific speed;
   d) generating compressed air from the number of compressors;
   e) supplying the compressed air to an air conditioning pack; and
   f) reducing the portion of pressurized air needed to drive the super charger with the number of turbines and compressors.

19. The method according to claim 18, wherein the number of turbines is two.

20. The method according to claim 19, wherein the number of compressors is one.

21. The method according to claim 18, wherein the total number of turbines and compressors is at least three.

22. The method according to claim 18, wherein matching said first and second specific speeds includes c1) determining a first and second efficiency respectively for the number of turbines and compressors, and c2) balancing the efficiencies to achieve a desired level of compressed air for the air conditioning pack.

\* \* \* \* \*